United States Patent
Uchino

(10) Patent No.: US 10,448,442 B2
(45) Date of Patent: Oct. 15, 2019

(54) WIRELESS COMMUNICATION APPARATUS, RECORDING MEDIUM, AND WIRELESS COMMUNICATION METHOD

(71) Applicant: FUJITSU LIMITED, Kawasaki-shi, Kanagawa (JP)

(72) Inventor: Makoto Uchino, Hamura (JP)

(73) Assignee: FUJITSU CONNECTED TECHNOLOGIES LIMITED, Kawasaki (JP)

(*) Notice: Subject to any disclaimer, the term of this patent is extended or adjusted under 35 U.S.C. 154(b) by 150 days.

(21) Appl. No.: 15/079,553

(22) Filed: Mar. 24, 2016

(65) Prior Publication Data

US 2016/0295474 A1   Oct. 6, 2016

(30) Foreign Application Priority Data

Apr. 2, 2015 (JP) ................... 2015-076343

(51) Int. Cl.
*H04W 28/02* (2009.01)
*H04W 76/15* (2018.01)
(Continued)

(52) U.S. Cl.
CPC ......... *H04W 76/15* (2018.02); *H04L 67/2838* (2013.01); *H04L 69/28* (2013.01);
(Continued)

(58) Field of Classification Search
CPC ..... H04W 36/06; H04W 28/00; H04W 72/00; H04W 36/30; H04W 76/025; H04L 67/00; H04L 43/0888
(Continued)

(56) References Cited

U.S. PATENT DOCUMENTS

2009/0244087 A1* 10/2009 Okano ............... H04W 52/027
                                                            345/589
2014/0026140 A1*  1/2014 Gupta ..................... H04L 67/06
                                                            718/104

(Continued)

FOREIGN PATENT DOCUMENTS

| EP | 1901499 A1 | 3/2008 |
| WO | 2009/142059 | 11/2009 |
| WO | 2014/060927 A2 | 4/2014 |

OTHER PUBLICATIONS

EESR—The Extended European Search Report dated Aug. 18, 2016, issued for European Patent Application No. 16159255.5.

*Primary Examiner* — Marcus Hammonds
(74) *Attorney, Agent, or Firm* — Westerman, Hattori, Daniels & Adrian, LLP

(57) ABSTRACT

A wireless communication apparatus according to an embodiment includes: a communicating unit that performs one selected from between a first download process that downloads data through a wireless communication by dividing the data into sections while using a plurality of threads and a second download process that downloads the data while using a single thread; a measuring unit that measures communication quality of the wireless communication; a judging unit that, when a deterioration in the communication quality is measured during the first download process, judges whether or not it is possible to complete the download in all of the plurality of threads before a timeout; and a controlling unit that, when it is determined to be impossible to complete the download in all of the plurality of threads before the timeout, switches the first download process into the second download process.

6 Claims, 6 Drawing Sheets

(51) Int. Cl.
*H04L 29/06* (2006.01)
*H04L 29/08* (2006.01)
*H04W 76/20* (2018.01)
*H04L 12/26* (2006.01)

(52) U.S. Cl.
CPC ......... *H04W 28/02* (2013.01); *H04L 43/0888* (2013.01); *H04L 67/2814* (2013.01); *H04L 67/2861* (2013.01); *H04W 76/20* (2018.02)

(58) Field of Classification Search
USPC ..................................................... 455/452.2
See application file for complete search history.

(56) References Cited

U.S. PATENT DOCUMENTS

2014/0143431 A1   5/2014  Watson et al.
2015/0207743 A1*  7/2015  Zanger .................... H04L 67/14
                                                                709/233

\* cited by examiner

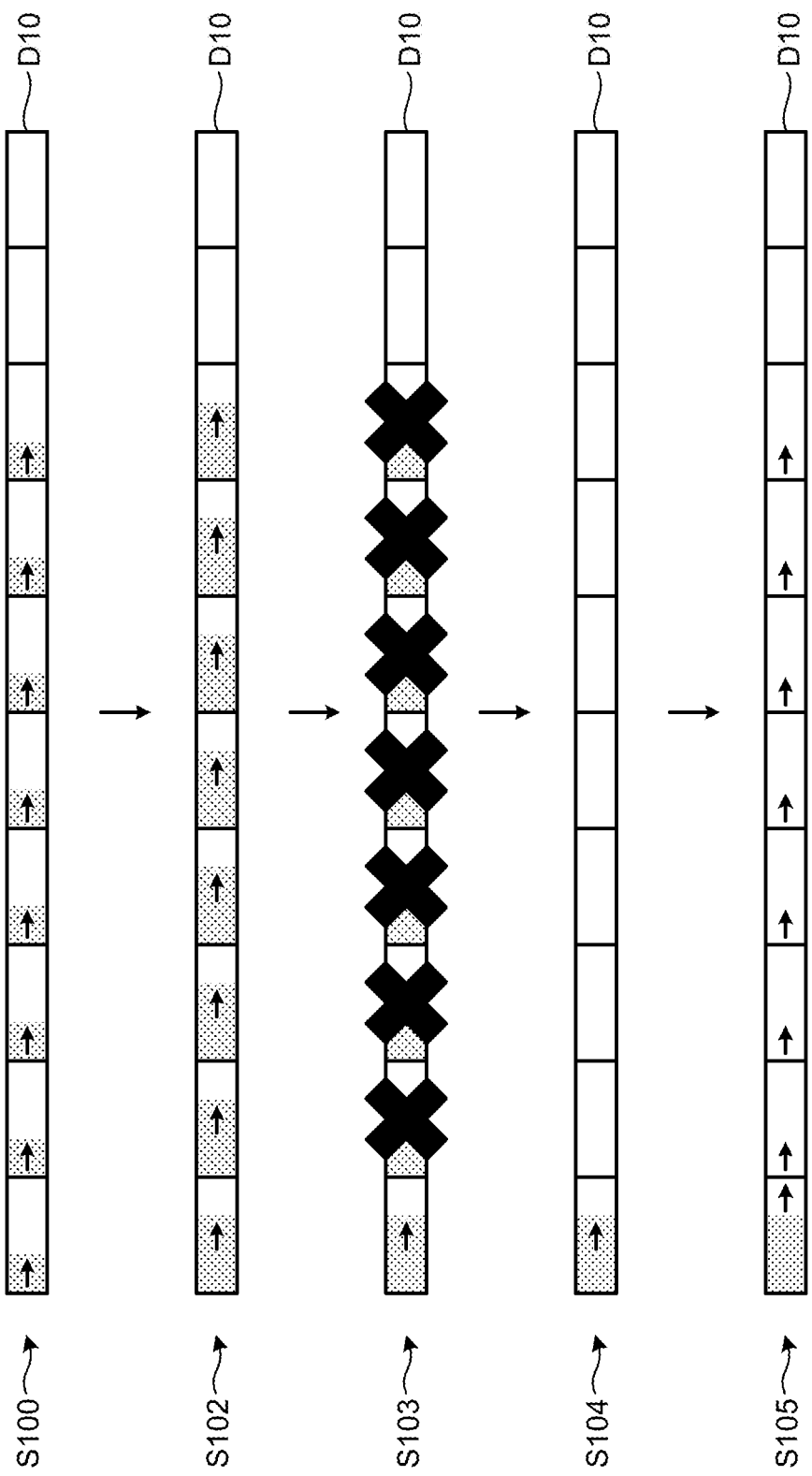

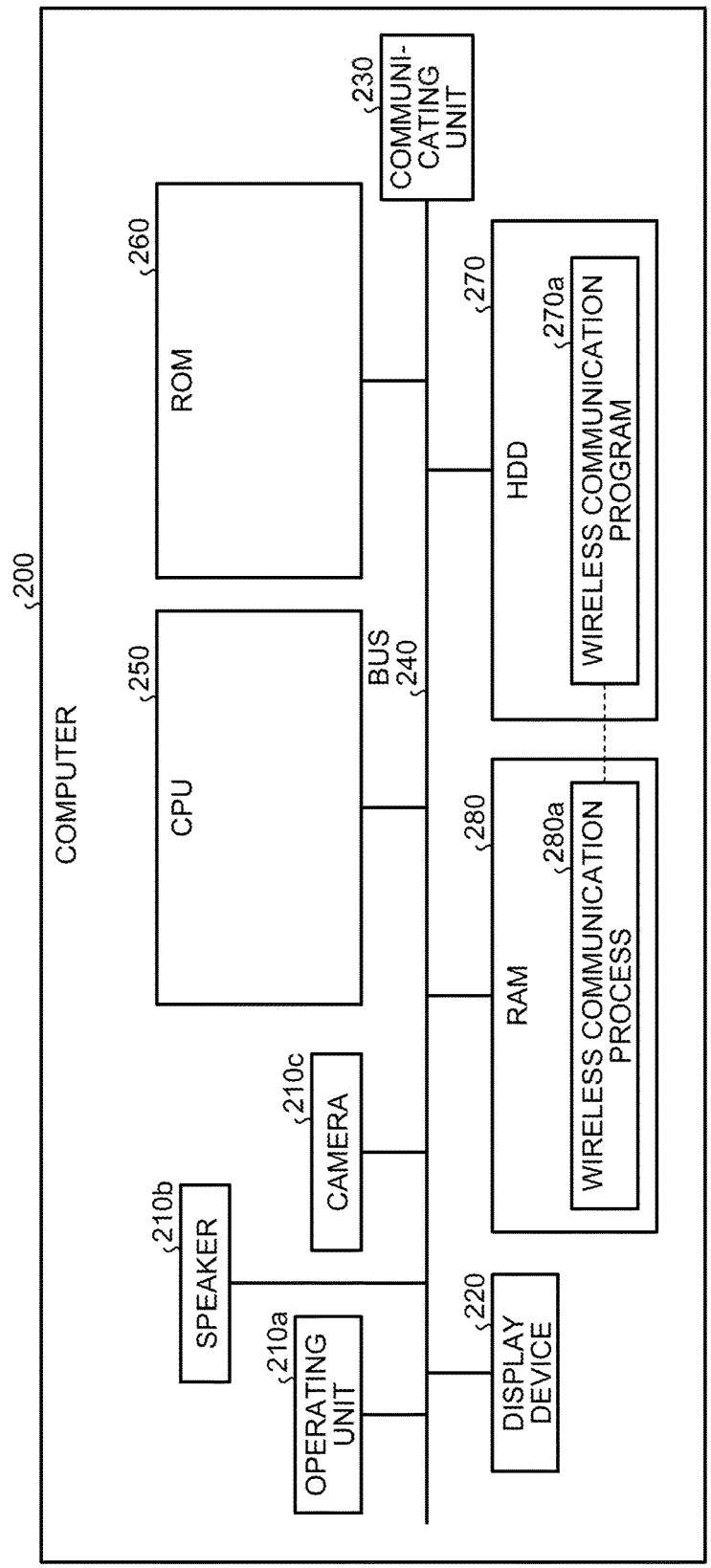

WIRELESS COMMUNICATION APPARATUS, RECORDING MEDIUM, AND WIRELESS COMMUNICATION METHOD

CROSS-REFERENCE TO RELATED APPLICATION

This application is based upon and claims the benefit of priority of the prior Japanese Patent Application No. 2015-076343, filed on Apr. 2, 2015, the entire contents of which are incorporated herein by reference.

FIELD

The embodiment discussed herein is related to a wireless communication apparatus, a recording medium, and a wireless communication method.

BACKGROUND

In recent years, various techniques have been developed in the field of wireless communications, in order to efficiently utilize limited wireless resources between mobile stations and base stations. Examples of such techniques include a divided download method by which data is divided into sections so that the divided sections can be downloaded at the same time. According to the divided download method, communication resources are efficiently utilized by downloading the divided sections of data at the same time. Compared to other methods by which data is downloaded without being divided into sections, the divided download method is able to realize a data communication at a higher speed.

Patent Document 1: International Publication Pamphlet No. WO 2009/142059

According to the conventional technique described above, however, a problem arises where, when a deterioration has occurred in the communication quality during the download of the data, the progress of the download is worse than when using a method by which the data is downloaded without being divided into sections.

For example, when a deterioration in the communication quality has occurred during the download of the data due to a degradation of the communication environment or a restriction imposed on the communication volume, the throughput may decrease and the download may be timed out without being completed. When the download is timed out, according to a method by which the data is downloaded without being divided into sections, the download is resumed starting with a continuation of the data that had been downloaded before the timeout. In contrast, when the divided download method is used, the download is resumed starting with a continuation of the section of data continuous from the head among the sections of data that had been downloaded, and the other sections of data that are not continuous from the head are discarded. As explained herein, according to the divided download method, some data is discarded when the timeout occurs due to the deterioration in the communication quality. Consequently, the efficiency of the download is lower than when using a method by which the data is downloaded without being divided into sections.

SUMMARY

According to an aspect of an embodiment, a wireless communication apparatus includes: a communicating unit that performs one selected from between a first download process that downloads data through a wireless communication by dividing the data into sections while using a plurality of threads and a second download process that downloads the data while using a single thread; a measuring unit that measures communication quality of the wireless communication; a judging unit that, when a deterioration in the communication quality is measured during the first download process, judges whether or not it is possible to complete the download in all of the plurality of threads before a timeout; and a controlling unit that, when it is determined to be impossible to complete the download in all of the plurality of threads before the timeout, switches the first download process into the second download process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a drawing for explaining an example of a divided download process; and FIG. 6 is a drawing for explaining an example of a computer that executes a wireless communication computer program.

DESCRIPTION OF EMBODIMENTS

Figure 1:
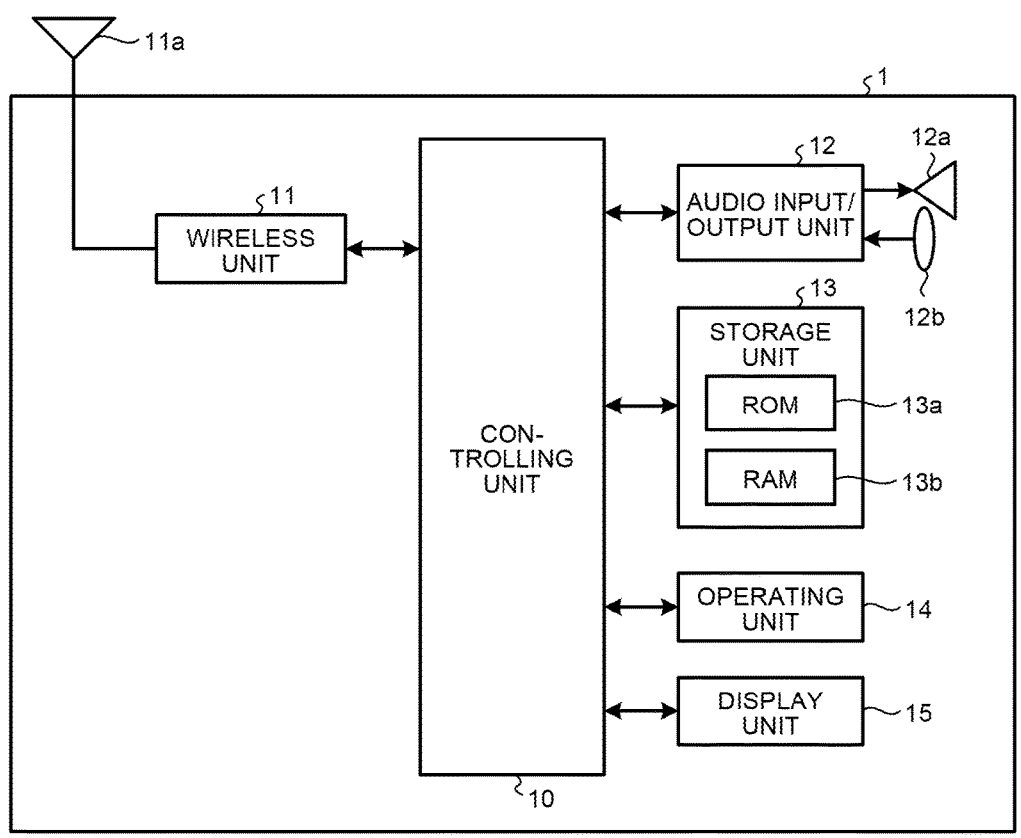
FIG. 1 is a block diagram illustrating a hardware configuration of a wireless communication apparatus according to an embodiment.

Preferred embodiments of the present invention will be explained with reference to accompanying drawings. In the description of the embodiments, some of the elements that have mutually-the same functions will be referred to by using the same reference characters, and duplicate explanations thereof will be omitted. Further, the wireless communication apparatus, the wireless communication program, and the wireless communication method explained in the embodiments below are merely examples and are not intended to limit possible embodiments. Further, it is also acceptable to combine any of the embodiments described below as appropriate, as long as no conflict arises therebetween.

FIG. 1 is a block diagram illustrating a hardware configuration of a wireless communication apparatus 1 according to an embodiment. As illustrated in FIG. 1, the wireless communication apparatus 1 includes a controlling unit 10, a wireless unit 11, an audio input/output unit 12, a storage unit 13, an operating unit 14, and a display unit 15. For example, the wireless communication apparatus 1 may be a personal computer, a smartphone, a tablet-type terminal, or the like.

The controlling unit 10 is a processing unit that controls processes in the entirety of the wireless communication apparatus 1. The controlling unit 10 reads a computer program (hereinafter, "program") from the storage unit 13 and executes processes. For example, the controlling unit 10 realizes the functional configuration illustrated in FIG. 2 and performs the processes explained with reference to FIG. 3 and so forth, by executing the processes.

Under the control of the controlling unit 10, the wireless unit 11 wirelessly communicates with another mobile apparatus or a base station apparatus, by using an antenna 11$a$. More specifically, the wireless unit 11 wirelessly communicates with another mobile apparatus or a base station apparatus by using a communication method such as a Long Term Evolution (LTE) communication method or a Wireless Fidelity (WiFi; a registered trademark) communication method. Although the present embodiment is described as the wireless unit 11 performing the communication via a communication carrier by using the LTE communication method, it is also acceptable to improve the communication speed of the wireless communication by using a plurality of communication methods at the same time.

The audio input/output unit 12 outputs audio that is input thereto from the controlling unit 10, through a speaker 12$a$. Further, the audio input/output unit 12 collects audio through a microphone 12$b$ and outputs the collected audio to the controlling unit 10.

The storage unit 13 is a storage device such as a memory, a hard disk, or the like. The storage unit 13 includes, for example, a Read-Only Memory (ROM) 13$a$ and a Random Access Memory (RAM) 13$b$. The ROM 13$a$ stores therein the program executed by the controlling unit 10 and various types of data. The RAM 13$b$ provides a working space used when the controlling unit 10 executes the program. More specifically, the RAM 13$b$ stores therein processing results, various types of tables, and the like generated by the program executed by the controlling unit 10 and the like.

The operating unit 14 is configured by using a keyboard, a touch panel and/or the like, receives various types of inputs from a user, and outputs the received inputs to the controlling unit 10. The display unit 15 is configured by using a liquid crystal display device or the like and displays various type of information under the control of the controlling unit 10.

Figure 2:
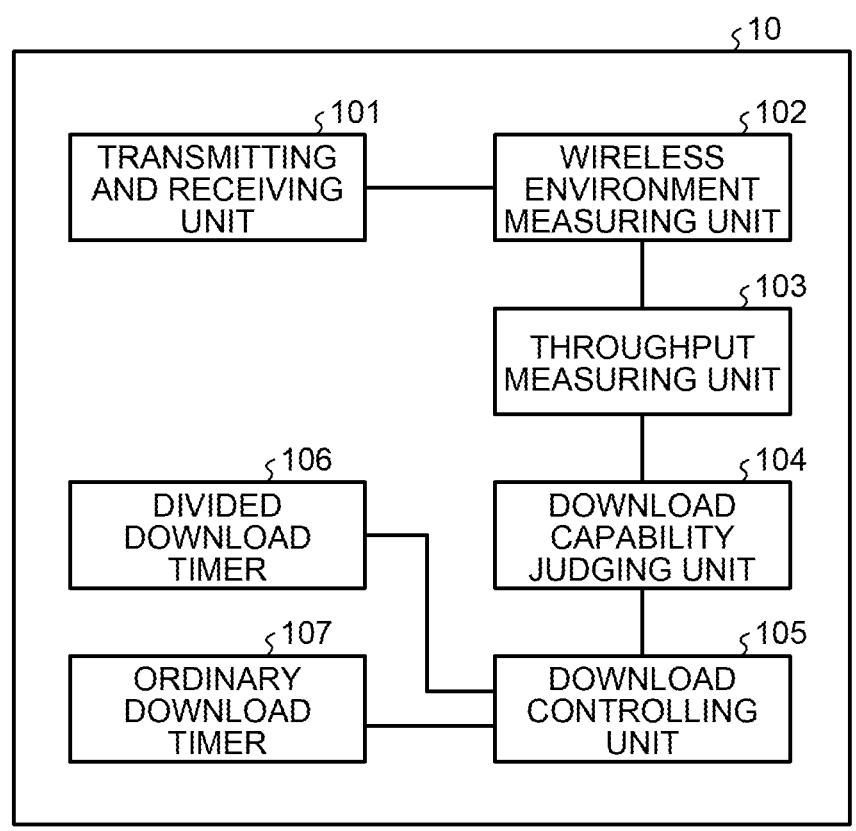
FIG. 2 is a block diagram illustrating a functional configuration of a controlling unit.

FIG. 2 is a block diagram illustrating a functional configuration of the controlling unit 10. As illustrated in FIG. 2, the controlling unit 10 includes a transmitting and receiving unit 101, a wireless environment measuring unit 102, a throughput measuring unit 103, a download capability judging unit 104, a download controlling unit 105, a divided download timer 106, and an ordinary download timer 107. These elements in the functional configuration are realized as a result of the controlling unit 10 executing the processes. The elements in the functional configuration input and output signals and data among one another, in one or both directions.

The transmitting and receiving unit 101 transmits and receives data via the wireless unit 11. More specifically, under control of the download controlling unit 105, the transmitting and receiving unit 101 downloads data from another device (e.g., a server apparatus provided in a communication network such as the Internet) to which a connection is made via a wireless communication performed by the wireless unit 11. The download performed on the data by the transmitting and receiving unit 101 may be a divided download process or an ordinary download process.

The divided download process is a method by which content data to be downloaded is divided into sections, so that the divided sections are downloaded in parallel to one another. The divided sections of content data are downloaded in parallel to one another while using a plurality of threads. For example, during the divided download process, data positions that are positioned apart from one another in the content data are each used as a download start position of a different one of the threads, so that the threads each perform a download in parallel to one another.

The ordinary download process is a method by which content data to be downloaded is sequentially downloaded starting from the head position thereof, while using a single thread. Under the control of the download controlling unit 105, the transmitting and receiving unit 101 downloads the content data to be downloaded, by performing one selected from between the ordinary download process and the divided download process.

Further, when downloading a large volume of data by separating the data starting from the head thereof, the transmitting and receiving unit 101 may perform one selected from between the divided download process and the ordinary download process, on each of the separated sections. For example, when downloading a piece of 100-megabyte data, the transmitting and receiving unit 101 may separate the data into sections of 10 megabytes from the head thereof and may perform one selected from between the divided download process and the ordinary download process on each of the sections.

The wireless environment measuring unit 102 measures wireless environment of the wireless unit 11 through which the data is transmitted and received by the transmitting and receiving unit 101. The wireless environment may be any type of information as long as the quality of the communication line (communication line quality) through which the data is transmitted and received is indicated. For example, the communication line quality may be indicated by a Received Signal Strength Indication (RSSI) value, a Signal-to-Noise Ratio (SNR) value, or the like of the wireless communication performed by the wireless unit 11. The wireless environment measuring unit 102 calculates an RSSI value and/or a SNR value by measuring the signal strength or the like of the wireless communication performed by the wireless unit 11, so as to measure the wireless environment of the wireless unit 11.

The throughput measuring unit 103 measures a throughput of the data transmitted and received by the wireless communication apparatus 1 through the transmitting and receiving unit 101. It is possible to measure the throughput by counting the number of packets and the number of bytes transmitted and received by the transmitting and receiving unit 101. For example, while the transmitting and receiving unit 101 downloads data, it is possible to measure the throughput during the download, by counting the number of packets and the number of bytes that are received.

The download capability judging unit 104 judges whether or not it is possible to complete the data download performed by the transmitting and receiving unit 101 before a timeout of the download. For example, the download capability judging unit 104 judges whether or not it is possible to complete the download before the timeout, on the basis of the data size (the data amount) of the data that has not yet been downloaded, the remaining time period before the timeout of the download, and the throughput value measured by the throughput measuring unit 103.

More specifically, during a divided download process, the download capability judging unit 104 judges whether or not it is possible to complete the divided download process before the timeout, when a deterioration in the communication quality of the wireless unit 11 is detected on the basis of the measured result obtained by the wireless environment measuring unit 102 or the throughput measuring unit 103.

For example, let us discuss an example in which, while the transmitting and receiving unit 101 is performing a divided download process, a deterioration in the communication quality is detected on the basis of the measured result obtained by the wireless environment measuring unit 102 or the throughput measuring unit 103 (details will be explained later). In that situation, the download capability judging unit 104 obtains how much time is remaining before the divided download process is timed out, on the basis of a timer value of the divided download timer 106. Subsequently, the download capability judging unit 104 obtains the throughput value measured by the throughput measuring unit 103 and the data size of the data that has not yet been downloaded. After that, the download capability judging unit 104 calculates an expected time period indicating how long it is expected to take to complete the download, on the basis of the measured throughput value and the data size of the data that has not yet been downloaded. Further, the download capability judging unit 104 judges whether or not it is possible to complete the divided download process before the timeout, by judging whether or not the calculated expected time period is shorter than the remaining time period before the timeout.

The download controlling unit 105 controls the execution of the ordinary download process or the divided download process performed by the transmitting and receiving unit 101. For example, the download controlling unit 105 causes the transmitting and receiving unit 101 to perform the divided download process. Further, when the download capability judging unit 104 has determined, during the execution of the divided download process, that it is impossible to complete the divided download process before the timeout, the download controlling unit 105 switches the divided download process into the ordinary download process. After having switched the divided download process into the ordinary download process, the download controlling unit 105 keeps the download performed continuously as the ordinary download process, so as to have the download of the content data completed.

The divided download timer 106 is a timer that clocks the timeout of the download during the divided download process. For example, when the divided download process is performed by the transmitting and receiving unit 101, the download controlling unit 105 causes the divided download timer 106 to start clocking the time after the divided download process is started. After that, when the download has not been completed within a predetermined time period, the download is timed out, and the download controlling unit 105 first suspends the download performed by the transmitting and receiving unit 101, before causing the download to start again.

The ordinary download timer 107 is a timer that clocks a timeout for a download when the ordinary download process is performed. For example, when the ordinary download process is performed by the transmitting and receiving unit 101, the download controlling unit 105 causes the ordinary download timer 107 to start clocking the time after the ordinary download process is started. After that, when the download has not been completed within a predetermined time period, the download is timed out, and the download controlling unit 105 first suspends the download performed by the transmitting and receiving unit 101, before causing the download to start again.

The timer values of the divided download timer 106 and the ordinary download timer 107 are managed as, for example, X seconds (e.g., twelve seconds) × the number of times of retry attempts Y (e.g., five times). For example, when the timer value is set as X=12 (seconds) and Y=5 (times), when the download has not been completed within twelve seconds, the retry attempt is made five times before the download is timed out. Thus, the time period from the start of the download to the timeout is 60 seconds.

As for the timer values of the divided download timer 106 and the ordinary download timer 107, mutually-different timer values may be set on the basis of a numerical value indicating the total amount of data to be downloaded, the amount of each of the pieces of data to be downloaded in parallel to one another, or the like. For example, the value of X may be set to increase in stages in accordance with an increase in the total amount of data to be downloaded. In that situation, because it is assumed that the divided download process takes a shorter period of time than the ordinary download process, the increment for the increase in the value X of the divided download timer 106 is arranged to be smaller than the increment for the increase in the value X of the ordinary download timer 107. As explained herein, it is acceptable to set the mutually-different timer values for the timeout of the divided download process and the timeout of the ordinary download process, in correspondence with the mutually-different download methods.

Figure 3:
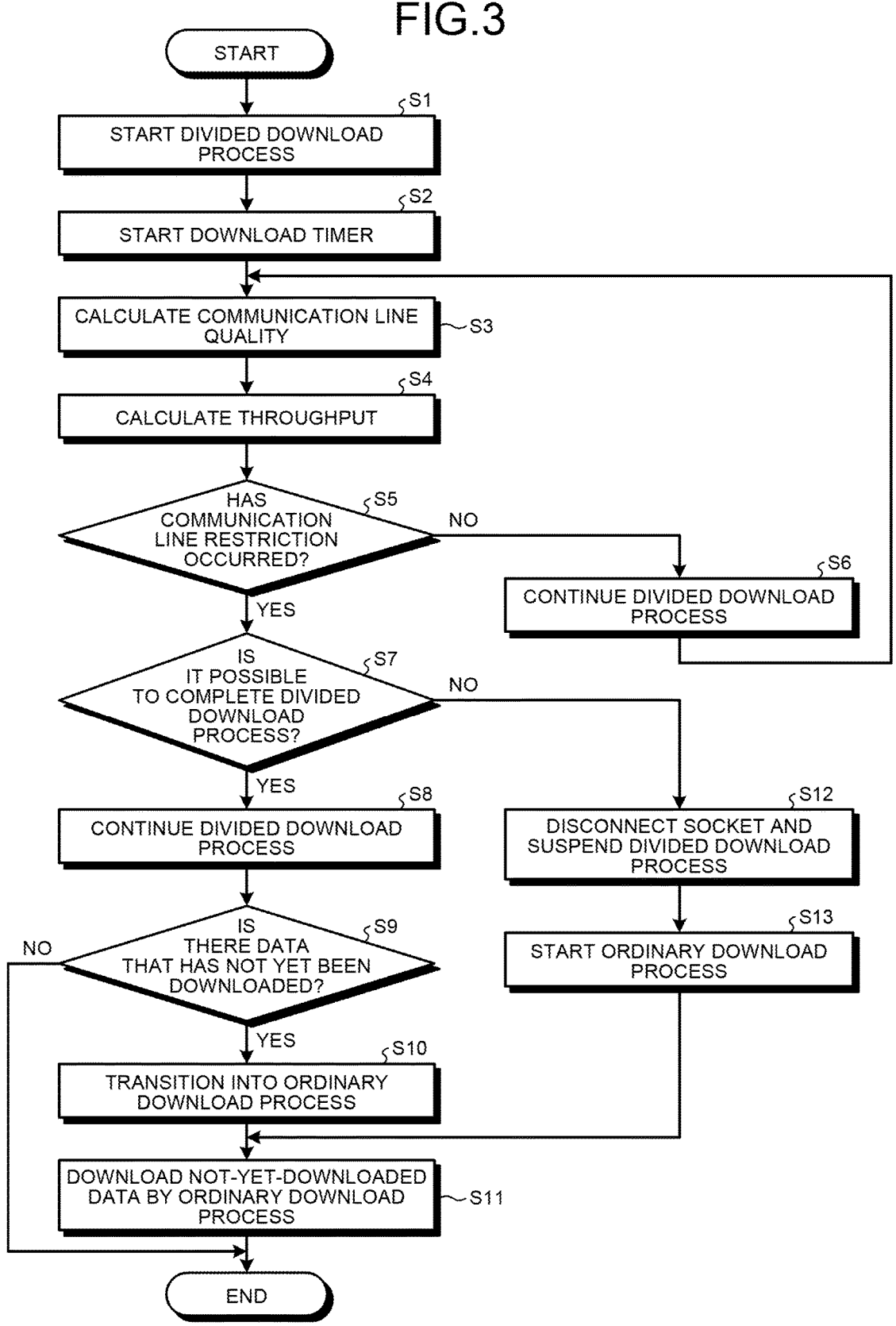
FIG. 3 is a flowchart illustrating an operation of the wireless communication apparatus according to the embodiment.

FIG. 3 is a flowchart illustrating an operation of the wireless communication apparatus 1 according to the embodiment. More specifically, FIG. 3 is a flowchart illustrating an example of the operation performed when data is downloaded after the wireless communication apparatus 1 specifies content data to be downloaded that is stored in a server apparatus or the like.

As illustrated in FIG. 3, when a process is started, the download controlling unit 105 causes the transmitting and receiving unit 101 to start a divided download process (step S1) and causes the divided download timer 106 to start (start clocking) (step S2). In this situation, it is acceptable to have the divided download process started at the beginning of the download of the content data. Alternatively, it is also acceptable to have an ordinary download process started at the beginning, so as to have a divided download process started some time during the download.

After the divided download process is started, the wireless environment measuring unit 102 measures the wireless environment of the wireless unit 11 and calculates the communication line quality (e.g., an RSSI value) (step S3). Subsequently, the throughput measuring unit 103 calculates a throughput during the download, by counting the number of packets and the number of bytes transmitted and received by the transmitting and receiving unit 101 (step S4). The processes at steps S3 and S4 are regularly performed (e.g., at intervals of 500 msec) during the divided download process, after the divided download process is started.

After that, the download capability judging unit 104 judges whether or not a communication line restriction that decreases the communication speed of the communication line via the wireless unit 11 has occurred, on the basis of the communication line quality and the throughput obtained at steps S3 and S4 (step S5). More specifically, when the value indicating the communication line quality (e.g., the RSSI value) is equal to or larger than a predetermined value, while the throughput is equal to or lower than a predetermined value, the download capability judging unit 104 determines that a communication line restriction to suppress the communication speed has occurred, due to communication control exercised on the communication carrier side.

When no communication line restriction has occurred (step S5: No), the download controlling unit 105 keeps the divided download process performed continuously by the transmitting and receiving unit 101 (step S6), and the process returns to step S3. When no communication line restriction has occurred, the communication speed is not suppressed by communication control exercised on the communication carrier side. Thus, because the throughput has not been lowered, the divided download process is expected to be able to download the data at a high speed. Consequently, it is possible to download the data efficiently by keeping the divided download process performed continuously.

When a communication line restriction has occurred (step S5: Yes), the download capability judging unit 104 judges whether or not it is possible to complete the divided download process performed by the transmitting and receiving unit 101 before a timeout (step S7). More specifically, the download capability judging unit 104 judges whether or not it is possible to complete the divided download process before the timeout, on the basis of the remaining time period of the divided download timer 106, the measured throughput value, and the size of the data that has not yet been downloaded.

When it has been determined that it is possible to complete the divided download process before the timeout (step S7: Yes), the download controlling unit 105 keeps the divided download process performed continuously by the transmitting and receiving unit 101 (step S8). As a result, for example, when a large volume of data is downloaded while being separated into sections from the head thereof, the divided download process keeps being performed continuously on the sections currently being downloaded.

Subsequently, the download controlling unit 105 judges whether there is any section data from the content data that has not yet been downloaded (step S9). For example, when a large volume of data is downloaded while being separated into sections from the head thereof, the download controlling unit 105 judges, at step S9, whether there is any section that has not yet been downloaded.

When there is no section data that has not yet been downloaded (step S9: No) the download controlling unit 105 determines that the download is completed and ends the process. On the contrary, when there is section data that has not yet been downloaded (step S9: Yes), the download controlling unit 105 causes the download performed by the transmitting and receiving unit 101 to transition into an ordinary download process (step S10). Accordingly, the transmitting and receiving unit 101 downloads the remaining section data, by performing an ordinary download process (step S11).

When a communication line restriction has occurred and the throughput is decreased, the divided download process is not expected to be able to download the data at a high speed. Accordingly, by downloading the remaining section data by performing the ordinary download process, it is possible to download the data efficiently without causing wasteful overhead from multiple threads.

When it is determined to be impossible to complete the divided download process before the timeout (step S7: No), the download controlling unit 105 disconnects the socket for the communication of the current download, so as to suspend the divided download process performed by the transmitting and receiving unit 101 (step S12). Subsequently, the download controlling unit 105 causes the transmitting and receiving unit 101 to start an ordinary download process (step S13). Accordingly, as for the data remaining after the point in time at which the download was suspended, the transmitting and receiving unit 101 downloads the data by performing the ordinary download process (step S11).

As explained above, when it is determined to be impossible to complete the divided download process before the timeout, it is possible to download the data efficiently by switching the divided download process into the ordinary download process promptly without waiting for the timeout of the divided download process.

Figure 4:
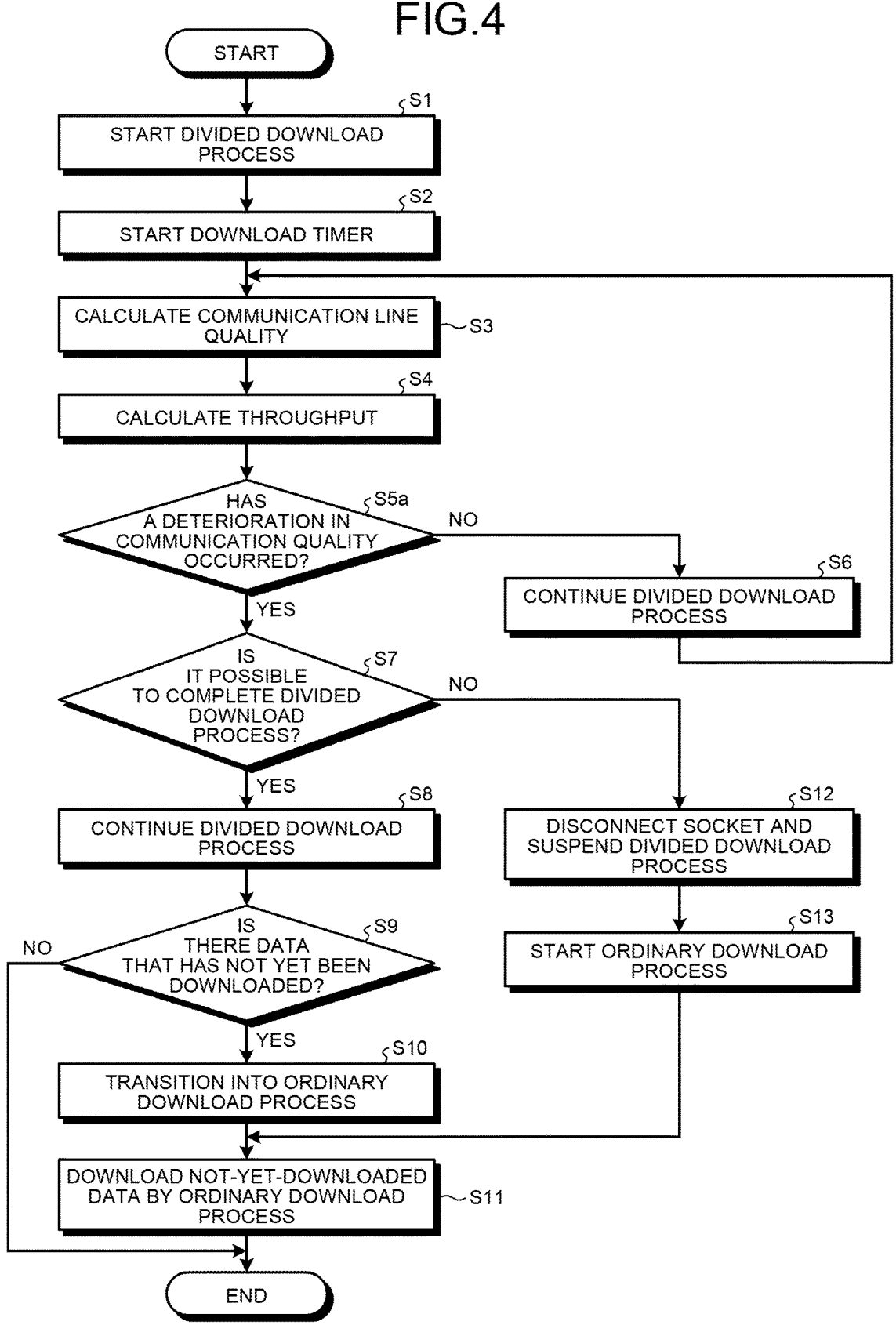
FIG. 4 is a flowchart illustrating another operation of the wireless communication apparatus according to the embodiment.

FIG. 4 is a flowchart illustrating another operation of the wireless communication apparatus 1 according to the embodiment and is a flowchart to explain a modification example of the operation illustrated in FIG. 3.

As illustrated in FIG. 4, according to the present modification example, the download capability judging unit 104 judges whether or not a deterioration in the communication quality has occurred in the wireless communication performed by the wireless unit 11, on the basis of the communication line quality or the throughput obtained at steps S3 and S4 (step S5a).

For example, when a value indicating the communication line quality (e.g., the RSSI value) is equal to or smaller than a predetermined value, the download capability judging unit 104 determines that a deterioration in the communication quality has occurred. Similarly, when the throughput is equal to or lower than a predetermined value, the download capability judging unit 104 determines that a deterioration in the communication quality has occurred. The judgment on the deterioration in the communication quality may be made by using at least one selected from between the communication line quality and the throughput.

When no deterioration has occurred in the communication quality (step S5a: No), the download controlling unit 105 keeps the divided download process performed continuously by the transmitting and receiving unit 101 (step S6), and the process returns to step S3. When no deterioration has occurred in the communication quality, it is presumed that the communication speed has not decreased. The divided download process is therefore expected to be able to download the data at a high speed. Consequently, it is possible to download the data efficiently, by keeping the divided download process performed continuously.

When a deterioration in the communication quality has occurred (step S5a: Yes), because it is presumed that the communication speed has decreased and because the divided download process is not expected to be able to download the data at a high speed, the download capability judging unit 104 performs the process at step S7 and thereafter described above. With these arrangements, even when the deterioration has occurred in the communication quality during the divided download process, it is possible to download the data efficiently, by switching the divided download process into the ordinary download process.

FIG. 5 is a drawing for explaining an example of a divided download process. In the example illustrated in FIG. 5, with respect to data D10, which is data to be downloaded, a divided download process is performed while using eight threads (step S100). During the divided download process (step S102), when a timeout occurs according to the divided download timer 106, the pieces of data in the sections that are not continuous from the head are discarded (step S103). Subsequently, the data in the section continuous from the head is determined to be valid, and the download is suspended for a predetermined period of time (e.g., five minutes) (step S104). After that, when the divided download process is continued, the download is resumed, starting with a continuation of the data continuous from the head (step S105). As for the sections that are not continuous from the head, the download is started from the beginning. Consequently, when the download is continued even after the download is timed out due to a deterioration in the communication quality or the like, the efficiency of the download is lowered because some data is discarded every time a timeout occurs.

In contrast, when a deterioration in the communication quality is measured during a divided download process, the download capability judging unit 104 included in the wireless communication apparatus 1 judges whether it is possible to complete the download before the timeout of the divided download process. Further, when it is determined to be impossible to complete the download before the timeout of the divided download process, the download controlling unit 105 switches the divided download process into the ordinary download process. For this reason, when the divided download process is timed out due to a deterioration in the communication quality or the like, the wireless communication apparatus 1 is able to realize an efficient download by switching the divided download process, which is expected to degrade the download efficiency, to the ordinary download process.

The constituent elements of the apparatuses illustrated in the drawings do not necessarily have to be physically configured as indicated in the drawings. In other words, the specific modes of distribution and integration of the apparatuses are not limited to those illustrated in the drawings. It is acceptable to functionally or physically distribute or integrate all or a part of the apparatuses in any arbitrary units, depending on various loads and the status of use.

Further, the various types of processes described in the embodiments above may be realized by causing a computer such as a personal computer or a workstation to execute a program prepared in advance. Accordingly, an example of a computer that executes a wireless communication program having the same functions as those described in the embodiments above will be explained below, with reference to FIG. 6.

FIG. 6 is a drawing for explaining an example of a computer that executes a wireless communication program 270a. As illustrated in FIG. 6, a computer 200 includes an operating unit 210a, a speaker 210b, a camera 210c, a display device 220, and a communicating unit 230. Further, the computer 200 includes a Central Processing Unit (CPU) 250, a ROM 260, a Hard Disk Drive (HDD) 270, and a RAM 280. These functional units 210 to 280 are connected together via a bus 240.

The HDD 270 stores therein, in advance, the wireless communication program 270a that realizes the same functions as those of the transmitting and receiving unit 101, the wireless environment measuring unit 102, the throughput measuring unit 103, the download capability judging unit 104, the download controlling unit 105, the divided download timer 106, and the ordinary download timer 107 described in the embodiments above. The wireless communication program 270a may be integrated or separated as appropriate, similarly to the constituent elements such as the transmitting and receiving unit 101, the wireless environment measuring unit 102, the throughput measuring unit 103, the download capability judging unit 104, the download controlling unit 105, the divided download timer 106, and the ordinary download timer 107. For example, as for the data stored in the HDD 270, all of the data does not necessarily have to be stored in the HDD 270 at all times. It is acceptable to arrange only the data needed in each process to be stored in the HDD 270.

In the computer 200, the CPU 250 reads the wireless communication program 270a from the HDD 270 and loads the read program into the RAM 280. As a result, the wireless communication program 270a functions as a wireless communication process 280a. The wireless communication process 280a loads, as appropriate, various types of data read from the HDD 270 into such a region of the RAM 280 that is assigned thereto and executes various types of processes on the basis of the various types of loaded data. In this situation, the wireless communication process 280a includes processes performed by the transmitting and receiving unit 101, the wireless environment measuring unit 102, the throughput measuring unit 103, the download capability judging unit 104, the download controlling unit 105, the divided download timer 106, and the ordinary download timer 107. Further, as for the processing units that are virtually realized in the CPU 250, all of the processing units do not necessarily have to be in operation in the CPU 250 at all times. It is acceptable to arrange only the processing units needed in each process to be virtually realized.

Further, the wireless communication program 270a described above does not necessarily have to be stored in the HDD 270 or the ROM 260 from the beginning. For example, it is acceptable to store programs in a "portable physical medium" such as a flexible disk, a so-called Floppy Disk (FD), a Compact Disk Read-Only Memory (CD-ROM), a Digital Versatile Disk (DVD), a magneto-optical disk, an Integrated Circuit (IC) card, or the like, that can be inserted into the computer 200. Further, the computer 200 may obtain and execute the programs from any of the portable physical media. Alternatively, it is also acceptable to store the programs in another computer or a server apparatus that is connected to the computer 200 via a public circuit, the Internet, a Local Area Network (LAN), a Wide Area Network (WAN), or the like, so that the computer 200 obtains and executes the programs from the stored location.

According to at least one aspect of the embodiments of the present disclosure, it is possible to download the data efficiently.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A wireless communication apparatus comprising a processor that executes a process comprising:
performing a download process selected from between a first download process that downloads data through a wireless communication by dividing the data into sections while using a plurality of threads and a second download process that downloads the data while using a single thread;
measuring communication quality of the wireless communication;
judging, when the selected download process is the first download process and when a deterioration in the communication quality is measured during the first download process, whether or not it is possible to complete the download in all of the plurality of threads before a timeout of the download; and switching the first download process into the second download process, when it is determined to be impossible to complete the download in all of the plurality of threads before the timeout, wherein the measuring includes measuring a value indicating communication line quality of the wireless communication, the value indicating the communication line quality of the wireless communication being a Received Signal Strength Indication (RSSI) value or a Signal-to-Noise Ratio (SNR) value, and includes measuring a value indicating a throughput of the wireless communication, and the judging includes performing a first judgement that judges whether or not the measured value indicating the communication line quality during the first download process is equal to or larger than a first predetermined value, performing a second judgement that judges the measured value indicating the throughput is equal to or smaller than a second predetermined value, and when the measured value indicating the communication line quality during the first download process is equal to or larger than the first predetermined value while the measured value indicating the throughput is equal to or smaller than the second predetermined value as a result of the first judgement and the second judgement, judging whether or not it is possible to complete the download in all of the plurality of threads before the timeout of the download.

2. The wireless communication apparatus according to claim 1, wherein, when the deterioration in the communication quality is measured during the first download process, the judging includes judging on a basis of a remaining time period before the timeout, whether or not it is possible to complete the download in all of the plurality of threads within the remaining time period.

3. A non-transitory computer-readable recording medium having stored therein a wireless communication computer program that causes a computer to execute a process comprising:

performing a download process selected from between a first download process that downloads data through a wireless communication by dividing the data into sections while using a plurality of threads and a second download process that downloads the data while using a single thread;

measuring communication quality of the wireless communication;

judging, when the selected download process is the first download process and when a deterioration in the communication quality is measured during the first download process, whether or not it is possible to complete the download in all of the plurality of threads before a timeout of the download; and switching the first download process into the second download process, when it is determined to be impossible to complete the download in all of the plurality of threads before the timeout, wherein the measuring includes measuring a value indicating communication line quality of the wireless communication, the value indicating the communication line quality of the wireless communication being a Received Signal Strength Indication (RSSI) value or a Signal-to-Noise Ratio (SNR) value, and includes measuring a value indicating a throughput of the wireless communication, and the judging includes performing a first judgement that judges whether or not the measured value indicating the communication line quality during the first download process is equal to or larger than a first predetermined value, performing a second judgement that judges the measured value indicating the throughput is equal to or smaller than a second predetermined value, and when the measured value indicating the communication line quality during the first download process is equal to or larger than the first predetermined value while the measured value indicating the throughput is equal to or smaller than the second predetermined value as a result of the first judgement and the second judgement, judging whether or not it is possible to complete the download in all of the plurality of threads before the timeout of the download.

4. The non-transitory computer-readable recording medium according to claim 3, wherein, when the deterioration in the communication quality is measured during the first download process, the judging includes judging on a basis of a remaining time period before the timeout, whether or not it is possible to complete the download in all of the plurality of threads within the remaining time period.

5. A wireless communication method comprising:

performing a download process selected from between a first download process that downloads data through a wireless communication by dividing the data into sections while using a plurality of threads and a second download process that downloads the data while using a single thread, using a processor;

measuring communication quality of the wireless communication, using the processor;

judging, when the selected download process is the first download process and when a deterioration in the communication quality is measured during the first download process, whether or not it is possible to complete the download in all of the plurality of threads before a timeout of the download, using the processor; and switching the first download process into the second download process, when it is determined to be impossible to complete the download in all of the plurality of threads before the timeout, using the processor, wherein the measuring includes measuring a value indicating communication line quality of the wireless communication, the value indicating the communication line quality of the wireless communication being a Received Signal Strength Indication (RSSI) value or a Signal-to-Noise Ratio (SNR) value, and includes measuring a value indicating a throughput of the wireless communication, and the judging includes performing a first judgement that judges whether or not the measured value indicating the communication line quality during the first download process is equal to or larger than a first predetermined value, performing a second judgement that judges the measured value indicating the throughput is equal to or smaller than a second predetermined value, and when the measured value indicating the communication line quality during the first download process is equal to or larger than the first predetermined value while the measured value indicating the throughput is equal to or smaller than the second predetermined value as a result of the first judgement and the second judgement, judging whether or not it is possible to complete the download in all of the plurality of threads before the timeout of the download.

6. The wireless communication method according to claim 5, wherein, when the deterioration in the communication quality is measured during the first download process, the judging includes judging on a basis of a remaining time period before the timeout, whether or not it is possible to complete the download in all of the plurality of threads within the remaining time period.

* * * * *